(12) United States Patent
Yook et al.

(10) Patent No.: US 10,731,008 B2
(45) Date of Patent: Aug. 4, 2020

(54) PHOTOCURABLE SILICONE COMPOSITION AND CURED PRODUCT THEREOF

(71) Applicants: Dow Silicones Corporation, Midland, MI (US); Dow Corning Toray Co., Ltd., Tokyo (JP)

(72) Inventors: Ju Young Yook, Chungcheongbuk-do (KR); Makoto Yoshitake, Chiba (JP)

(73) Assignees: Dow Toray Co., Ltd., Tokyo (JP); Dow Silicones Corporation, Midland, MI (US)

( * ) Notice: Subject to any disclaimer, the term of this patent is extended or adjusted under 35 U.S.C. 154(b) by 41 days.

(21) Appl. No.: 16/082,669

(22) PCT Filed: Mar. 7, 2017

(86) PCT No.: PCT/US2017/021052
§ 371 (c)(1),
(2) Date: Sep. 6, 2018

(87) PCT Pub. No.: WO2017/155919
PCT Pub. Date: Sep. 14, 2017

(65) Prior Publication Data
US 2019/0112430 A1    Apr. 18, 2019

Related U.S. Application Data

(60) Provisional application No. 62/304,382, filed on Mar. 7, 2016.

(51) Int. Cl.
| | | |
|---|---|---|
| C09D 183/04 | (2006.01) |
| C08G 77/20 | (2006.01) |
| C08K 5/101 | (2006.01) |
| C08K 5/13 | (2006.01) |
| C08K 5/37 | (2006.01) |
| C08K 5/5313 | (2006.01) |
| C08L 83/04 | (2006.01) |

(52) U.S. Cl.
CPC ............ *C08G 77/20* (2013.01); *C08K 5/101* (2013.01); *C08K 5/13* (2013.01); *C08K 5/37* (2013.01); *C08K 5/5313* (2013.01); *C08L 83/04* (2013.01); *C09D 183/04* (2013.01)

(58) Field of Classification Search
None
See application file for complete search history.

(56) References Cited

U.S. PATENT DOCUMENTS

| | | | | |
|---|---|---|---|---|
| 4,707,503 A * | 11/1987 | Itoh | .............. | C08K 5/5406 522/99 |
| 4,780,486 A * | 10/1988 | Lee | .............. | C03C 25/106 522/14 |
| 4,935,455 A * | 6/1990 | Huy | .............. | C03C 25/106 522/83 |
| 4,985,472 A * | 1/1991 | Aosai | .............. | C08F 299/065 522/64 |
| 5,302,627 A * | 4/1994 | Field | .............. | C08F 2/46 522/13 |
| 5,420,222 A * | 5/1995 | Stepp | .............. | C08L 83/04 528/31 |
| 5,952,397 A | 9/1999 | Fujiki et al. | | |
| 6,627,672 B1 * | 9/2003 | Lin | .............. | C08J 3/243 522/148 |
| 7,309,732 B1 * | 12/2007 | Issari | .............. | C08F 2/48 522/71 |
| 2002/0107298 A1 * | 8/2002 | Al-Akhdar | .............. | C08F 2/48 522/7 |
| 2003/0139499 A1 * | 7/2003 | Suhadolnik | .............. | C08F 2/48 524/91 |
| 2004/0209972 A1 * | 10/2004 | Chambers | .............. | C08J 3/243 522/99 |
| 2006/0084716 A1 * | 4/2006 | Zahora | .............. | C08G 18/4213 522/178 |
| 2006/0128826 A1 * | 6/2006 | Ellison | .............. | B82Y 30/00 522/127 |
| 2007/0043205 A1 * | 2/2007 | Dias | .............. | C08F 283/00 528/373 |
| 2009/0166559 A1 * | 7/2009 | Levandoski | .............. | C08J 3/243 250/484.4 |
| 2012/0270961 A1 * | 10/2012 | Kotani | .............. | C08F 2/48 522/18 |

(Continued)

FOREIGN PATENT DOCUMENTS

| | | |
|---|---|---|
| JP | 2013253179 A | 12/2013 |
| WO | WO2015148318 A1 | 10/2015 |

OTHER PUBLICATIONS

International Search Report for PCT/US2017/021052, dated May 26, 2017, 4 pages.

(Continued)

*Primary Examiner* — Robert S Loewe
(74) *Attorney, Agent, or Firm* — Warner Norcross + Judd LLP

(57) ABSTRACT

A photocurable silicone composition comprises: (A) an organopolysiloxane represented by the average composition formula: $R^1_a R^2_b SiO_{(4-a-b)/2}$ where $R^1$ is an alkenyl group having from 2 to 12 carbons, $R^2$ is an alkyl group having from 1 to 12 carbons, an aryl group having from 6 to 12 carbons, or an aralkyl group having from 7 to 12 carbons; provided that, at least 30 mol % of $R^2$ are the aryl groups or the aralkyl groups; and "a" and "b" are positive numbers satisfying: $1 \leq (a+b) \leq 2.5$ and $0.001 \leq a/(a+b) \leq 0.2$; (B) an organic compound having at least two ether bonds and at least one aliphatic carbon-carbon double bond in a molecule; (C) a compound having at least two thiol groups in a molecule; (D) a photoradical initiator having a phosphorus atom; and (E) a hindered phenol compound.

5 Claims, No Drawings

(56) References Cited

U.S. PATENT DOCUMENTS

| | | | |
|---|---|---|---|
| 2013/0004676 A1* | 1/2013 | Ha | C08F 2/50 |
| | | | 427/508 |
| 2013/0065983 A1* | 3/2013 | Ono | C08L 83/08 |
| | | | 522/172 |
| 2013/0165593 A1* | 6/2013 | Ichiryu | C08F 293/005 |
| | | | 525/303 |
| 2014/0216649 A1* | 8/2014 | Woods | C08F 8/02 |
| | | | 156/275.5 |
| 2014/0287642 A1* | 9/2014 | Kumar | C08F 283/12 |
| | | | 442/290 |
| 2015/0232666 A1* | 8/2015 | Ono | C08K 3/36 |
| | | | 522/8 |
| 2015/0252234 A1* | 9/2015 | Okazaki | C09J 4/00 |
| | | | 524/710 |
| 2016/0032102 A1* | 2/2016 | Srikanth | C08K 5/005 |
| | | | 522/64 |
| 2016/0244625 A1* | 8/2016 | Clapp | C08F 283/124 |
| 2017/0226371 A1* | 8/2017 | Deshpande | C09D 133/14 |

OTHER PUBLICATIONS

English language abstract and machine-assisted English translation for JP2013253179 extracted from espacenet.com database on Aug. 14, 2018, 30 pages.

* cited by examiner

PHOTOCURABLE SILICONE COMPOSITION AND CURED PRODUCT THEREOF

CROSS-REFERENCE TO RELATED APPLICATIONS

This application is the National Stage of International Application No. PCT/US2017/021052 filed on 7 Mar. 2017, which claims priority to and all advantages of U.S. Provisional Patent Application No. 62/304,382 filed on 7 Mar. 2016, the content of which is hereby incorporated by reference.

The present invention relates to a photocurable silicone composition and a cured product thereof.

Japanese Unexamined Patent Application Publication No. 2013-253179A proposes an ultraviolet radiation-curable silicone composition comprising: a straight-chain organopolysiloxane having an aliphatic unsaturated group; an organopolysiloxane having a silicon atom-bonded mercaptoalkyl group; an acylphosphine oxide-based photoreaction initiator; and acetophenone and/or propiophenone.

However, such an ultraviolet radiation-curable silicone composition has a problem of poor deep curability by ultraviolet radiation and insufficient curing, and a problem of occurrence of coloring and haze caused by exposure of the silicone cured product to high temperature or high humidity conditions.

An object of the present invention is to provide a photocurable silicone composition having excellent deep curability by an active energy ray irradiation. Furthermore, another object of the present invention is to provide a cured product that maintains transparency without causing haze even when the cured product is left in high temperature/high humidity conditions.

Solution to Problem

The photocurable silicone composition of the present invention comprises:

(A) 100 parts by mass of an organopolysiloxane represented by the average composition formula:

$$R^1_a R^2_b SiO_{(4-a-b)/2}$$

wherein, $R^1$ is an alkenyl group having from 2 to 12 carbons, $R^2$ is an alkyl group having from 1 to 12 carbons, an aryl group having from 6 to 12 carbons, or an aralkyl group having from 7 to 12 carbons; provided that, at least 30 mol % of $R^2$ are the aryl groups or the aralkyl groups; and "a" and "b" are positive numbers satisfying: $1 \le a+b \le 2.5$ and $0.001 \le a/(a+b) \le 0.2$;

(B) from 3 to 30 parts by mass of an organic compound having at least two ether bonds and at least one aliphatic carbon-carbon double bond in a molecule;

(C) a compound having at least two thiol groups in a molecule, in an amount that the amount of the thiol groups in the present component is from 0.2 to 2.0 mol per 1 mol of the total aliphatic carbon-carbon double bonds in the present composition;

(D) from 0.05 to 1.0 part by mass of a photoradical initiator having a phosphorus atom; and (E) from 0.001 to 1.0 part by mass of a hindered phenol compound.

The cured product of the present invention is obtained by irradiating the photocurable silicone composition described above with light.

Effects of Invention

The photocurable silicone composition of the present invention is cured by irradiation with an active energy ray, and an unirradiated portion close to the irradiated portion can be also cured. Furthermore, the cured product of the present invention maintains transparency and is less likely to cause coloring and haze even when being left in high temperature/high humidity conditions.

DETAILED DESCRIPTION OF THE INVENTION

First, the photocurable silicone composition of the present invention will be described in detail.

Component (A) is a base compound of the present composition and is an organopolysiloxane represented by the average composition formula:

$$R^1_a R^2_b SiO_{(4-a-b)/2}.$$

In the formula, $R^1$ is an alkenyl group having from 2 to 12 carbons, and examples thereof include vinyl group, allyl group, butenyl group, pentenyl group, hexenyl group, heptenyl group, octenyl group, nonenyl group, decenyl group, undecenyl group, and dodecenyl group. Among these, vinyl group and hexenyl group are preferred.

In the formula, $R^2$ is an alkyl group having from 1 to 12 carbons, an aryl group having from 6 to 12 carbons, or an aralkyl group having from 7 to 12 carbons. Examples of the alkyl group include methyl group, ethyl group, propyl group, isopropyl group, butyl group, pentyl group, hexyl group, heptyl group, octyl group, nonyl group, decyl group, undecyl group, and dodecyl group. Among these, methyl group is preferred. Examples of the aryl group include phenyl group, tolyl group, naphthyl group, and biphenyl group. Among these, phenyl group is preferred. Examples of the aralkyl group include phenylmethyl group, 1-phenylethyl group, 2-phenylethyl group, and 2-phenylpropyl group. Among these, 2-phenylethyl group and 2-phenylpropyl group are preferred. In component (A), at least 30 mol % of $R^2$ in a molecule are the aryl groups or the aralkyl groups.

Furthermore, in the formula, "a" and "b" are positive numbers satisfying: $1 \le a+b \le 2.5$, and preferably $1.5 \le a+b \le 2.2$, and satisfying: $0.001 \le a/(a+b) \le 0.2$, and preferably $0.005 \le a/(a+b) \le 0.1$.

The state of component (A) at 25° C. is not limited and is preferably a liquid. The viscosity at 25° C. of component (A) is not limited; however, the viscosity is preferably in a range of 100 to 1000000 mPa·s.

Component (A) may be one type of organopolysiloxane that satisfies the average composition formula above or may be a mixture of at least two types of organopolysiloxanes that satisfy the average composition formula above. Examples of such component (A) include organopolysiloxanes represented by the following "average composition formulas: average formulas". Note that, in the formulas, "Me", "Vi", "Hex", "Ph", "Phe", and "Php" respectively indicate methyl group, vinyl group, hexenyl group, phenyl group, 2-phenylethyl group, and 2-phenylpropyl group.

$Vi_{0.03}Me_{1.03}Ph_{0.97}SiO_{0.99}$: $ViMe_2SiO(MePhSiO)_{65}SiMe_2Vi$ $Vi_{0.10}Me_{1.10}Ph_{0.90}SiO_{0.95}$: $ViMe_2SiO(MePhSiO)_{18.4}SiMe_2Vi$ $Vi_{0.09}Me_{1.06}Ph_{0.91}SiO_{0.97}$: $PhSi\{O(PhMeSiO)_{10}SiMe_2Vi\}_3$ $Hex_{0.09}Me_{1.07}Ph_{0.89}SiO_{0.98}$: $Si\{O(PhMeSiO)_{10}SiMe_2Hex\}_4$ $Hex_{0.12}Me_{1.12}Ph_{0.88}SiO_{0.94}$: $HexMe_2SiO(PhMeSiO)_{15}SiMe_2Hex$ $Vi_{0.06}Me_{1.38}Phe_{0.63}SiO_{0.97}$: $ViMe_2SiO(PheMeSiO)_{20}(Me_2SiO)_{10}SiMe_2Vi$ $Hex_{0.06}Me_{1.35}Php_{0.63}SiO_{0.97}$: $HexMe_2SiO(PhpMeSiO)_{20}(Me_2SiO)_{10}SiMe_2Hex$

Component (B) is a second base compound of the present composition and is an organic compound having at least two ether bonds and at least one aliphatic carbon-carbon double bond in a molecule. The group having an aliphatic carbon-carbon double bond in component (B) is not limited, and examples thereof include an alkenyl group, an acryloyl group, and a methacryloyl group. Among these, an acryloyl group or a methacryloyl group is preferred. Furthermore, the state of component (B) at 25° C. is not limited and is preferably a liquid. The viscosity at 25° C. of component (B) is not limited; however, the viscosity is preferably in a range of 1 to 10000 mPa·s.

Examples of such component (B) include phenoxy diethylene glycol acrylate, phenoxy tetraethylene glycol acrylate, methoxy triethylene glycol acrylate, methoxy nonaethylene glycol acrylate, methoxy polyethylene glycol acrylate, ethoxy diethylene glycol acrylate, ethoxyethoxyethyl acrylate, nonylphenoxy tetraethylene glycol acrylate, nonylphenoxy octaethylene glycol acrylate, nonylphenoxy dipropylene glycol acrylate, methoxy diethylene glycol methacrylate, methoxy polyethylene glycol methacrylate, polyethylene glycol methacrylate, triethylene glycol diacrylate, polyethylene glycol diacrylate, dipropylene glycol diacrylate, tripropylene glycol diacrylate, polypropylene glycol diacrylate, bisphenol diethylene glycol diacrylate, bisphenol A triethylene glycol diacrylate, tetraethylene glycol diacrylate, bisphenol A polyethylene glycol diacrylate, diethylene glycol dimethacrylate, triethylene glycol dimethacrylate, polyethylene glycol dimethacrylate, polypropylene glycol dimethacrylate, bisphenol A diethylene glycol dimethacrylate, bisphenol A triethylene glycol dimethacrylate, bisphenol A tetraethylene glycol dimethacrylate, bisphenol A polyethylene glycol dimethacrylate, triethylene glycol divinyl ether, tripropylene glycol divinyl ether, polyethylene glycol monoallyl ether, methoxy polyethylene glycol allyl ether, propylene glycol allyl ether, butoxy polyethylene glycol/propylene glycol allyl ether, polyethylene glycol diallyl ether, polypropylene glycol diallyl ether, trimethylolpropane triallyl ether, trimethylolpropane diallyl ether, pentaerythritol tetraallyl ether, and pentaerythritol triallyl ether.

The content of component (B) is in a range of 3 to 30 parts by mass, and preferably in a range of 5 to 20 parts by mass, per 100 parts by mass of component (A). This is because, when the content of component (B) is greater than or equal to the lower limit of the range described above, reduction in transmittance of the cured product at a high temperature/high humidity becomes small. On the other hand, when the content is less than or equal to the upper limit of the range described above, change in hardness of the cured product at a high temperature is made small and coloring is reduced.

Component (C) is a curing agent of the present composition and is a compound having at least two thiol groups in a molecule. Component (C) is not limited as long as a component has sufficient solubility in component (A) and/or component (B).

Examples of such component (C) include o-, m-, or p-xylenedithiol, ethyleneglycol bisthioglycolate, butanediol bisthioglycolate, hexanediol bisthioglycolate, ethyleneglycol bis(3-thiopropionate), butanediol bis(3-thiopropionate), trimethylolpropane tris(3-thiopropionate), pentaerythritol tetrakis(3-thiopropionate), trihydroxyethyl triisocyanuric acid tris(3-thiopropionate), and organopolysiloxanes substituted with a mercapto group.

The content of component (C) is an amount that the amount of the thiol groups provided by the present component is in a range of 0.2 to 2.0 mol, and preferably in a range of 0.3 to 1.6 mol, per 1 mol of the total aliphatic carbon-carbon double bonds of the present composition. This is because, when the content of component (C) is within the range described above, mechanical strength of the resulting cured product increases.

Component (D) is a component to initiate photocuring reaction of the present composition, and is a photoradical initiator containing a phosphorus atom. Examples of such component (D) include diphenyl(2,4,6-trimethylbenzoyl)phosphine oxide (trade name: TPO, manufactured by BASF), ethyl(2,4,6-trimethylbenzoyl)phenyl phosphonate (trade name: TPO-L, manufactured by BASF), and phenyl-bis(2,4,6-trimethylbenzoyl)phosphine oxide (trade name: Irgacure 819, manufactured by BASF).

The content of component (D) is in a range of 0.05 to 1.0 part by mass, and preferably in a range of 0.1 to 0.8 parts by mass, per 100 parts by mass of component (A). This is because, when the content of component (D) is within the range described above, curing efficiently proceeds to form a cured product having excellent heat resistance and light resistance.

Component (E) is a hindered phenol compound to impart heat resistance to a cured product of the present composition. Examples of such component (E) include pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 2,4-dimethyl-6-(1-methylpentadecyl)phenol, diethyl[{3,5-bis(1,1-di-tert-butyl-4-hydroxyphenyl)methyl}phosphonate, 3 3',3",5,5', 5"-hexane-tert-butyl-4-a,a',a"-(mesitylene-2,4,6-tolyl)tri-p-cresol, 4,6-bis(octylthiomethyl)-o-cresol, ethylenebis(oxyethylene)bis[3-(5-tert-butyl-4-hydroxy-m-tolyl) propionate], and hexamethylene bis[3-(3,5-di-tert-butyl-4-hydroxyphenyl)propionate].

The content of component (E) is in a range of 0.001 to 1 part by mass, and preferably in a range of 0.003 to 0.5 parts by mass, per 100 parts by mass of component (A). This is because, when the content of component (E) is within the range described above, change in viscosity of the composition prior to the photocuring is small and a cured product having excellent heat resistance and light resistance is obtained.

The present composition comprises component (A) to component (E) described above; however, to enhance storage stability in a light-shielded condition of the present composition, (F) a radical scavenger other than component (E) is preferably contained. Examples of such component (F) include hindered amines, such as N,N',N",N'"-tetrakis (4,6-bis(butyl-(N-methyl-2,2,6,6-tetramethylpiperidin-4-yl)amino)-triazin-2-yl)-4,7-diazadecane-1,10-diamine, bis(1,2, 2,6,6-pentamethyl-4-piperidyl)[[3,5-bis(1,1-dimethylethyl)-4-hydroxyphenyl]methyl]butylmalonate, methyl-1,2,2,6,6-pentamethyl-4-piperidyl)sebacate, bis(2,2,6,6-tetramethyl-4-piperidyl)sebacate, bis(1,2,2,6,6-pentamethyl-4-piperidyl) sebacate, and 8-acetyl-3-dodecyl-7,7,9,9-tetramethyl-1,3,8-triazaspiro[4.5]decane-2,4-dione; quinones or phenols, such as methylhydroquinone, 1,4-naphthoquinone, 4-methoxynaphthol, tert-butylhydroquinone, benzoquinone, pyrogallol, and phenothiazine.

The content of component (F) is not limited; however, the content is preferably in a range of 0.0001 to 1 part by mass, 0.0001 to 0.1 parts by mass, or 0.0001 to 0.05 parts by mass, per 100 parts by mass of component (A). This is because, when the content of component (F) is within the range described above, a cured product having excellent heat resistance and light resistance is obtained.

The present composition may further contain, as an optional component, (G) an organic compound having at least one aliphatic carbon-carbon double bond in a molecule other than components (A) and (B) described above; an adhesion-imparting agent; an inorganic filler, such as silica, titanium oxide, glass, alumina, or zinc oxide; an organic resin fine powder of polymethacrylate resin, silicone resin, or the like; as well as a pigment or a fluorescent substance, as long as the object of the present invention is not impaired.

Component (G) is not limited as long as a component is an organic compound having at least one aliphatic carbon-carbon double bond in a molecule and is preferably a liquid at 25° C. The viscosity at 25° C. of component (G) is not limited; however, the viscosity is preferably in a range of 1 to 500 mPa·s.

Examples of such component (G) include methyl acrylate, methyl methacrylate, butyl acrylate, butyl methacrylate, isobornyl acrylate, isobornyl methacrylate, isooctyl acrylate, lauryl acrylate, stearyl acrylate, isodecyl acrylate, triacrylate, hydroxyethyl acrylate, hydroxyethyl methacrylate, methoxyethyl acrylate, methoxyethyl methacrylate, phenoxyethyl acrylate, tetrahydrofuran acrylate, benzyl acrylate, o-phenylphenol ethoxyethyl acrylate, 2-ethylhexyl acrylate, hexane diol diacrylate, nonane diol diacrylate, 2-propenoic acid octahydro-4,7-methano-1H-inden-5-yl ester, decyl vinyl ether, 2-ethylhexyl vinyl ether, 1-octene, 1-decene, 1-dodecene, 1-tetradecene, 1-hexadecene, allyl methacrylate, divinyl sulfone, 3-methacryloxypropyltrimethoxysilane, and 3-acryloxypropyltrimethoxysilane.

The content of component (G) is not limited; however, the content is preferably 10 parts by mass or less, or 5 parts by mass or less, per 100 parts by mass of component (A).

Furthermore, examples the adhesion-imparting agent include silane compounds, such as 3-glycidoxypropyltrimethoxysilane, 2-(3,4-epoxycyclohexyl)ethyltrimethoxysilane, and 3-methacryloxy propyltrimethoxysilane; siloxane compounds having at least one of silicon atom-bonded alkenyl groups and/or silicon atom-bonded hydrogen atoms, and at least one silicon atom-bonded alkoxy group in a molecule; mixtures of a silane compound or siloxane compound having at least one silicon atom-bonded alkoxy group and a siloxane compound having at least one silicon atom-bonded hydroxy group and at least one silicon atom-bonded alkenyl group in a molecule; methyl polysilicate, ethyl polysilicate, and epoxy group-containing ethyl polysilicate. The content of the adhesion-imparting agent is not limited; however, the content is preferably in a range of 0.01 to 10 parts by mass per 100 parts by mass of component (A).

The viscosity at 25° C. of the present composition is not limited; however, the viscosity is preferably in a range of 100 to 100000 mPa·s, or in a range of 500 to 10000 mPa·s. This is because, when the viscosity of the present composition is greater than or equal to the lower limit of the range described above, a cured product having high mechanical strength can be obtained. On the other hand, when the viscosity is less than or equal to the upper limit of the range described above, excellent coatability/workability of the resulting composition is achieved and formation of a void in the cured product is avoided.

The cured product of the present invention will now be described in detail.

The cured product is a cured product obtained by irradiating the present composition with light. Examples of the light used to cure the present composition include ultraviolet light and visible light; however, the light with a wavelength in a range of 250 to 500 nm is preferred. This is because excellent curability is achieved and the cured product is not decomposed by the light.

The form of the cured product is not limited and may be in a sheet, film, or block form. The cured product may be combined with various substrates.

The present composition is useful as various potting agents, sealing agents, and adhesive agents. Since the cured product thereof causes less coloring at a high temperature or in a high temperature/high humidity condition and is less likely to cause haze, the present composition is suitable as a material to form a middle layer in between an image display part and a protective part of the image display device.

EXAMPLES

The photocurable silicone composition and the cured product thereof of the present invention will now be described in detail using Practical Examples and Comparative Examples. Note that, in the formulas, "Me", "Ph", and "Vi" respectively indicates methyl group, phenyl group, and vinyl group. The characteristics of the photocurable silicone composition and the cured product thereof were measured as follows.

Viscosity of Photocurable Silicone Composition

The viscosity at 25° C. of the photocurable silicone composition was measured using a cone plate viscometer.

Deep Curability of Photocurable Silicone Composition

Into a black tube in which one side was closed and which had a length of 20 cm and an inner diameter of 5 mm, a photocurable silicone composition was filled. From an opening of one side, ultraviolet light was irradiated using a high-pressure mercury lamp with UV illuminance of 200 mW/cm$^2$ for 20 seconds. After the irradiation, the tube was cut, and the length of the part where fluidity had lost due to the curing was measured.

Hardness of Cured Product

The photocurable silicone composition was filled into a mold having a concavity with a predetermined shape and was irradiated from the liquid surface at the top with ultraviolet light using a high-pressure mercury lamp in a manner that the cumulative radiation was 4000 mJ/cm$^2$. The hardness of the obtained cured product was measured using a Type 00 Shore Durometer by the method stipulated in ASTM 2240-00.

Transmittance and Haze of Cured Product

The plate-like cured product having a thickness of 500 μm that was cured as described above was subjected to transmittance and haze measurements according to the method stipulated in ASTM D1003. Thereafter, for a sample obtained by maintaining the plate-like cured product at 105° C. for 1000 hours and a sample obtained by maintaining the plate-like cured product in an environment at 85° C. and 85% RH for 1000 hours, each of transmittance and haze was measured in the same manner as the method described above.

Yellowness Index of Cured Product

The plate-like cured product having a thickness of 500 μm that was cured as described above was subjected to yellowness index b* measurement according to the method stipulated in ASTM D6290. Thereafter, for a sample obtained by maintaining the plate-like cured product at 105° C. for 1000 hours and a sample obtained by maintaining the plate-like cured product in an environment at 85° C. and 85% RH for 1000 hours, each yellowness index b* was measured in the same manner as the method described above.

The following organopolysiloxanes were used as component (A).

(a1) an organopolysiloxane that had a viscosity of 40000 mPa·s and that was represented by the average formula:

ViMe$_2$SiO(MePhSiO)$_{65}$SiMe$_2$Vi (the average composition formula: Vi$_{0.03}$Me$_{1.03}$Ph$_{0.97}$SiO$_{0.99}$)

(a2) an organopolysiloxane that had a viscosity of 2000 mPa·s and that was represented by the average formula:

ViMe$_2$SiO(MePhSiO)$_{18.4}$SiMe$_2$Vi (the average composition formula: Vi$_{0.10}$Me$_{1.10}$Ph$_{0.90}$SiO$_{0.95}$)

(a3) an organopolysiloxane that had a viscosity of 2000 mPa·s and that was represented by the average formula:

ViMe$_2$SiO(Me$_2$SiO)$_{300}$SiMe$_2$Vi (the average composition formula: Vi$_{0.01}$Me$_{2.00}$SiO$_{1.00}$)

The following organic compounds were used as component (B).

(b1): phenoxy tetraethylene glycol acrylate having a viscosity of 35 mPa·s
(b2): methoxy nonaethylene glycol acrylate having a viscosity of 90 mPa·s
(b3): nonylphenoxy tetraethylene glycol acrylate having a viscosity of 100 mPa·s
(b4): nonylphenoxy dipropylene glycol acrylate having a viscosity of 125 mPa·s
(b5): nonaethylene glycol diacrylate having a viscosity of 55 mPa·s
(b6): nonylphenoxy octaethylene glycol acrylate having a viscosity of 150 mPa·s The following compounds were used as component (C).
(c1): trimethylolpropane tris(3-thiopropionate)
(c2): pentaerythritol tetrakis(thioglycolate)
(c3): pentaerythritol tetrakis(3-thiopropionate)

The following photoradical initiators were used as component (D).
(d1): diphenyl(2,4,6-trimethylbenzoyl)phosphine oxide
(d2): ethyl(2,4,6-trimethylbenzoyl)phenyl phosphinate
(d3): phenylbis(2,4,6-trimethylbenzoyl)phosphine oxide
(d4): 2-hydroxy-2-methyl-1-phenylpropan-1-one
(d5): 1-hydroxycyclohexylphenylketone The following hindered phenol compounds were used as component (E).
(e1): di-tert-butylhydroxytoluene The following radical scavengers were used as component (F).
(f1): tert-butylhydroquinone
(f2): pyrogallol
(f3): aluminum-N-nitroso-N-phenylhydroxylamine
(f4): 4-methoxynaphthol The following organic compounds were used as component (G).
(g1): isobornyl acrylate having a viscosity of 15 mPa·s
(g2): tetrahydrofurfuryl acrylate having a viscosity of 10 mPa·s
(g3): isooctyl acrylate having a viscosity of 10 mPa·s
(g4): isodecyl acrylate having a viscosity of 10 mPa·s Practical Example 1

A photocurable silicone composition having a viscosity of 4970 mPa·s was prepared by mixing 100 parts by mass of an organopolysiloxane that consisted of 54 parts by mass of component (a1) and 46 parts by mass of component (a2), that had a viscosity of 10200 mPa·s, and that was represented by the average composition formula:

Vi$_{0.06}$Me$_{1.06}$Ph$_{0.94}$SiO$_{0.97}$ 5.2 parts by mass of component (b1), 10.6 parts by mass of component (c1) (an amount that the amount of thiol groups in the present component was 1.0 mol per 1 mol of the total aliphatic carbon-carbon double bonds in the present composition), 0.4 parts by mass of component (d1), 0.1 parts by mass of component (e1), 0.005 parts by mass of component (f1), 2.9 parts by mass of component (g1), and 0.6 parts by mass of component (g2). The characteristics of the photocurable silicone composition and the cured product thereof are shown in Table 1.

Practical Example 2

A photocurable silicone composition having a viscosity of 4072 mPa·s was prepared by mixing 100 parts by mass of an organopolysiloxane that consisted of 54 parts by mass of component (a1) and 46 parts by mass of component (a2), that had a viscosity of 10200 mPa·s, and that was represented by the average composition formula:

Vi$_{0.06}$Me$_{1.06}$Ph$_{0.94}$SiO$_{0.97}$ 10 parts by mass of component (b1), 20 parts by mass of component (c1) (an amount that the amount of thiol groups in the present component was 1.6 mol per 1 mol of the total aliphatic carbon-carbon double bonds in the present composition), 0.4 parts by mass of component (d1), 0.2 parts by mass of component (e1), 0.01 parts by mass of component (f1), 0.6 parts by mass of component (g2), and 2.4 parts by mass of component (g3). The characteristics of the photocurable silicone composition and the cured product thereof are shown in Table 1.

Practical Example 3

A photocurable silicone composition having a viscosity of 3230 mPa·s was prepared by mixing 100 parts by mass of an organopolysiloxane that consisted of 54 parts by mass of component (a1) and 46 parts by mass of component (a2), that had a viscosity of 10200 mPa·s, and that was represented by the average composition formula:

Vi$_{0.06}$Me$_{1.06}$Ph$_{0.94}$SiO$_{0.97}$ 10 parts by mass of component (b2), 8 parts by mass of component (b3), 5.9 parts by mass of component (c1) (an amount that the amount of thiol groups in the present component was 0.5 mol per 1 mol of the total aliphatic carbon-carbon double bonds in the present composition), 0.4 parts by mass of component (d1), 0.3 parts by mass of component (e1), 0.01 parts by mass of component (f1), and 0.65 parts by mass of component (g2). The characteristics of the photocurable silicone composition and the cured product thereof are shown in Table 1.

Practical Example 4

A photocurable silicone composition having a viscosity of 3450 mPa·s was prepared by mixing 100 parts by mass of an organopolysiloxane that consisted of 61 parts by mass of component (a1) and 39 parts by mass of component (a2), that had a viscosity of 12000 mPa·s, and that was represented by the average composition formula:

Vi$_{0.06}$Me$_{1.06}$Ph$_{0.94}$SiO$_{0.97}$ 9 parts by mass of component (b2), 5 parts by mass of component (b4), 16 parts by mass of component (c2) (an amount that the amount of thiol groups in the present component was 1.5 mol per 1 mol of the total aliphatic carbon-carbon double bonds in the present composition), 0.4 parts by mass of component (d1), 0.2 parts by mass of component (e1), 0.01 parts by mass of component (f1), 0.7 parts by mass of component (g2), and 4.6 parts by mass of component (g4). The characteristics of the photocurable silicone composition and the cured product thereof are shown in Table 1.

Practical Example 5

A photocurable silicone composition having a viscosity of 3270 mPa·s was prepared by mixing 100 parts by mass of an organopolysiloxane that consisted of 61 parts by mass of component (a1) and 39 parts by mass of component (a2), that had a viscosity of 12000 mPa·s, and that was represented by the average composition formula:

$Vi_{0.06}Me_{1.06}Ph_{0.94}SiO_{0.97}$ 13 parts by mass of component (b2), 2 parts by mass of component (b5), 12.4 parts by mass of component (c3) (an amount that the amount of thiol groups in the present component was 1.0 mol per 1 mol of the total aliphatic carbon-carbon double bonds in the present composition), 0.4 parts by mass of component (d1), 0.2 parts by mass of component (e1), 0.01 parts by mass of component (f1), 0.7 parts by mass of component (g2), and 5.2 parts by mass of component (g4). The characteristics of the photocurable silicone composition and the cured product thereof are shown in Table 1.

Practical Example 6

A photocurable silicone composition having a viscosity of 4.210 mPa·s was prepared by mixing 100 parts by mass of an organopolysiloxane that consisted of 47 parts by mass of component (a1) and 53 parts by mass of component (a2), that had a viscosity of 8200 mPa·s, and that was represented by the average composition formula:

$Vi_{0.07}Me_{1.07}Ph_{0.93}SiO_{0.97}$ 9 parts by mass of component (b2), 3.8 parts by mass of component (c1) (an amount that the amount of thiol groups in the present component was 0.4 mol per 1 mol of the total aliphatic carbon-carbon double bonds in the present composition), 0.4 parts by mass of component (d1), 0.3 parts by mass of component (e1), 0.01 parts by mass of component (f1), and 0.6 parts by mass of component (g2). The characteristics of the photocurable silicone composition and the cured product thereof are shown in Table 1.

Practical Example 7

A photocurable silicone composition having a viscosity of 3170 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b6), 12.7 parts by mass of component (c1) (an amount that the amount of thiol groups in the present component was 1.0 mol per 1 mol of the total aliphatic carbon-carbon double bonds in the present composition), 0.4 parts by mass of component (d1), 0.1 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 1.

Practical Example 8

A photocurable silicone composition having a viscosity of 3050 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b6), 12.7 parts by mass of component (c1) (an amount that the amount of thiol groups in the present component was 1.0 mol per 1 mol of the total aliphatic carbon-carbon double bonds in the present composition), 0.7 parts by mass of component (d1), 0.1 parts by mass of component (e1), 0.01 parts by mass of component (f2), 0.7 parts by mass of component (g2), and 2.7 parts by mass of component (g4). The characteristics of the photocurable silicone composition and the cured product thereof are shown in Table 1.

Practical Example 9

A photocurable silicone composition having a viscosity of 3110 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b6), 12.7 parts by mass of component (c1) (an amount that the amount of thiol groups in the present component was 1.0 mol per 1 mol of the total aliphatic carbon-carbon double bonds in the present composition), 0.4 parts by mass of component (d2), 0.1 parts by mass of component (e1), 0.005 parts by mass of component (f3), 0.7 parts by mass of component (g2), and 2.7 parts by mass of component (g4). The characteristics of the photocurable silicone composition and the cured product thereof are shown in Table 1.

Practical Example 10

A photocurable silicone composition having a viscosity of 3060 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b6), 12.7 parts by mass of component (c1) (an amount that the amount of thiol groups in the present component was 1.0 mol per 1 mol of the total aliphatic carbon-carbon double bonds in the present composition), 0.27 parts by mass of component (d3), 0.1 parts by mass of component (e1), 0.01 parts by mass of component (f4), 0.7 parts by mass of component (g2), and 2.7 parts by mass of component (g4). The characteristics of the photocurable silicone composition and the cured product thereof are shown in Table 1.

TABLE 1

|  |  |  | Practical Examples | | | | |
|---|---|---|---|---|---|---|---|
|  |  |  | 1 | 2 | 3 | 4 | 5 |
| Composition of photocurable silicone composition (part by mass) | (A) | (a1) | 54 | 54 | 54 | 61 | 61 |
|  |  | (a2) | 46 | 46 | 46 | 39 | 39 |
|  | (B) | (b1) | 5.2 | 10 | — | — | — |
|  |  | (b2) | — | — | 10 | 9 | 13 |
|  |  | (b3) | — | — | 8 | — | — |
|  |  | (b4) | — | — | — | 5 | — |
|  |  | (b5) | — | — | — | — | 2 |
|  |  | (b6) | — | — | — | — | — |
|  | (C) | (c1) | 10.6 | 20 | 5.9 | — | — |
|  |  | (c2) | — | — | — | 16 | — |
|  |  | (c3) | — | — | — | — | 12.4 |
|  | (D) | (d1) | 0.4 | 0.4 | 0.4 | 0.4 | 0.4 |
|  |  | (d2) | — | — | — | — | — |
|  |  | (d3) | — | — | — | — | — |
|  | (E) | (e1) | 0.1 | 0.2 | 0.3 | 0.2 | 0.2 |
|  | (F) | (f1) | 0.005 | 0.01 | 0.01 | 0.01 | 0.01 |
|  |  | (f2) | — | — | — | — | — |
|  |  | (f3) | — | — | — | — | — |
|  |  | (f4) | — | — | — | — | — |
|  | (G) | (g1) | 2.9 | — | — | — | — |
|  |  | (g2) | 0.6 | 0.6 | 0.65 | 0.7 | 0.7 |
|  |  | (g3) | — | 2.4 | — | — | — |
|  |  | (g4) | — | — | — | 4.6 | 5.2 |
| Deep curability (mm) |  |  | 28.5 | 25.3 | 36.0 | 38.2 | 32.1 |
| Characteristics of the cured product | Initial | Appearance | Transparent | Transparent | Transparent | Transparent | Transparent |
|  |  | Shore 00 hardness | 25 | 22 | 32 | 34 | 28 |
|  |  | Transmittance (%) | 97.8 | 98.2 | 98.5 | 97.6 | 98.4 |
|  |  | Haze | <0.5 | <0.5 | <0.5 | <0.5 | <0.5 |
|  |  | Yellowness index (b*) | <1.0 | <1.0 | <1.0 | <1.0 | <1.0 |
|  | 105° C., after 1000 hrs. | Transmittance (%) | 97.3 | 97.7 | 98.0 | 97.1 | 97.9 |
|  |  | Haze | <0.5 | <0.5 | <0.5 | <0.5 | <0.5 |
|  |  | Yellowness index (b*) | 0.9 | 0.8 | 0.9 | 1.1 | 1.0 |
|  | 85° C., 85% RH, after 1000 hrs. | Transmittance (%) | 95.8 | 96.2 | 96.5 | 95.6 | 96.4 |
|  |  | Haze | 4.1 | 2.7 | 3.5 | 2.8 | 1.8 |
|  |  | Yellowness index (b*) | 1.1 | 1.1 | 1.2 | 1.2 | 1.2 |

|  |  |  | Practical Examples | | | | |
|---|---|---|---|---|---|---|---|
|  |  |  | 6 | 7 | 8 | 9 | 10 |
| Composition of photocurable silicone composition (part by mass) | (A) | (a1) | 47 | 60 | 60 | 60 | 60 |
|  |  | (a2) | 53 | 40 | 40 | 40 | 40 |
|  | (B) | (b1) | — | — | — | — | — |
|  |  | (b2) | 9 | 11 | 11 | 11 | 11 |
|  |  | (b3) | — | — | — | — | — |
|  |  | (b4) | — | — | — | — | — |
|  |  | (b5) | — | — | — | — | — |
|  |  | (b6) | — | 8 | 8 | 8 | 8 |
|  | (C) | (c1) | 3.8 | 12.7 | 12.7 | 12.7 | 12.7 |
|  |  | (c2) | — | — | — | — | — |
|  |  | (c3) | — | — | — | — | — |
|  | (D) | (d1) | 0.4 | 0.4 | 0.7 | — | — |
|  |  | (d2) | — | — | — | 0.4 | — |
|  |  | (d3) | — | — | — | — | 0.27 |
|  | (E) | (e1) | 0.3 | 0.1 | 0.1 | 0.1 | 0.1 |
|  | (F) | (f1) | 0.01 | 0.01 | — | — | — |
|  |  | (f2) | — | — | 0.01 | — | — |
|  |  | (f3) | — | — | — | 0.005 | — |
|  |  | (f4) | — | — | — | — | 0.01 |
|  | (G) | (g1) | — | — | — | — | — |
|  |  | (g2) | 0.6 | 0.7 | 0.7 | 0.7 | 0.7 |
|  |  | (g3) | — | — | — | — | — |
|  |  | (g4) | — | 2.7 | 2.7 | 2.7 | 2.7 |

TABLE 1-continued

| | | | 33.4 | 38.4 | 41.2 | 40.4 | 40.5 |
|---|---|---|---|---|---|---|---|
| Deep curability (mm) | | | | | | | |
| Characteristics of the cured product | Initial | Appearance | Trans-parent | Trans-parent | Trans-parent | Trans-parent | Trans-parent |
| | | Shore 00 hardness | 30 | 32 | 32 | 32 | 32 |
| | | Transmittance (%) | 98.1 | 98.4 | 98.4 | 98.1 | 98.0 |
| | | Haze | <0.5 | <0.5 | <0.5 | <0.5 | <0.5 |
| | | Yellowness index (b*) | <1.0 | <1.0 | <1.0 | <1.0 | <1.0 |
| | 105° C., after 1000 hrs. | Transmittance (%) | 97.6 | 97.9 | 97.9 | 97.9 | 97.9 |
| | | Haze | <0.5 | <0.5 | <0.5 | <0.5 | <0.5 |
| | | Yellowness index (b*) | 1.1 | 0.9 | 1.1 | 1.5 | 1.7 |
| | 85° C., 85% RH, after 1000 hrs. | Transmittance (%) | 96.1 | 96.2 | 95.6 | 96.6 | 96.1 |
| | | Haze | 1.9 | 1.3 | 1.3 | 1.3 | 1.2 |
| | | Yellowness index (b*) | 1.3 | 0.4 | 2.1 | 1.3 | 1.9 |

Comparative Example 1

A photocurable silicone composition having a viscosity of 1120 mPa·s was prepared by mixing 100 parts by mass of component (a3), 10 parts by mass of component (b2), 8 parts by mass of component (b3), 12.7 parts by mass of component (c1) (an amount that the amount of thiol groups in the present component was 1.0 mol per 1 mol of the total aliphatic carbon-carbon double bonds in the present composition), 0.4 parts by mass of component (d1), 0.1 parts by mass of component (e1), 0.005 parts by mass of component (f1), and 0.6 parts by mass of component (g2). The characteristics of the photocurable silicone composition and the cured product thereof are shown in Table 2.

Comparative Example 2

A photocurable silicone composition having a viscosity of 8650 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$$Vi_{0.06}Me_{1.06}Ph_{0.94}SiO_{0.97}$$

5.7 parts by mass of component (c1) (an amount that the amount of thiol groups in the present component was 0.72 mol per 1 mol of the total aliphatic carbon-carbon double bonds in the present composition), 0.4 parts by mass of component (d1), 0.2 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 3

A photocurable silicone composition having a viscosity of 5440 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$$Vi_{0.06}Me_{1.06}Ph_{0.94}SiO_{0.97}$$

1.5 parts by mass of component (b1), 6.3 parts by mass of component (c1) (an amount that the amount of thiol groups in the present component was 0.74 mol per 1 mol of the total aliphatic carbon-carbon double bonds in the present composition), 0.4 parts by mass of component (d1), 0.2 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 4

A photocurable silicone composition having a viscosity of 1330 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$$Vi_{0.06}Me_{1.06}Ph_{0.94}SiO_{0.97}$$

40 parts by mass of component (b1), 6.3 parts by mass of component (c1) (an amount that the amount of thiol groups in the present component was 0.90 mol per 1 mol of the total aliphatic carbon-carbon double bonds in the present composition), 0.4 parts by mass of component (d1), 0.2 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 5

A photocurable silicone composition having a viscosity of 3700 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$$Vi_{0.06}Me_{1.06}Ph_{0.94}SiO_{0.97}$$

11 parts by mass of component (b2), 8 parts by mass of component (b4), 1.9 parts by mass of component (c1) (an amount that the amount of thiol groups in the present component was 0.15 mol per 1 mol of the total aliphatic carbon-carbon double bonds in the present composition), 0.4 parts by mass of component (d1), 0.2 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 6

A photocurable silicone composition having a viscosity of 2710 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b4), 28 parts by mass of component (c1) (an amount that the amount of thiol groups in the present component was 2.2 mol per 1 mol of the total aliphatic carbon-carbon double bonds of the present composition), 0.4 parts by mass of component (d1), 0.2 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 7

A photocurable silicone composition having a viscosity of 3080 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b4), 12.7 parts by mass of component (c1) (an amount that the amount of thiol groups in the present component was 1.0 mol per 1 mol of the total aliphatic carbon-carbon double bonds in the present composition), 0.02 parts by mass of component (d1), 0.2 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 8

A photocurable silicone composition having a viscosity of 3010 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b4), 12.7 parts by mass of component (c1) (an amount that the amount of thiol groups in the present component was 1.0 mol per 1 mol of the total aliphatic carbon-carbon double bonds in the present composition), 1.2 parts by mass of component (d1), 0.2 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 9

A photocurable silicone composition having a viscosity of 3110 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b4), 12.7 parts by mass of component (c1) (an amount that the amount of thiol groups in the present component was 1.0 mol per 1 mol of the total aliphatic carbon-carbon double bonds in the present composition), 0.40 parts by mass of component (d4), 0.1 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 10

A photocurable silicone composition having a viscosity of 2960 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b4), 12.7 parts by mass of component (c1) (an amount that the amount of thiol groups in the present component was 1.0 mol per 1 mol of the total aliphatic carbon-carbon double bonds in the present composition), 1.08 parts by mass of component (d4), 0.1 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 11

A photocurable silicone composition having a viscosity of 2960 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b4), 12.7 parts by mass of component (c1) (an amount that the amount of thiol groups in the present component was 1.0 mol per 1 mol of the total aliphatic carbon-carbon double bonds in the present composition), 1.08 parts by mass of component (d5), 0.1 parts by mass of component (e1), 0.01 parts by mass of component (f1), 0.7 parts by mass of component (g2), and 2.7 parts by mass of component (g4). The characteristics of the photocurable silicone composition and the cured product thereof are shown in Table 2.

Comparative Example 12

A photocurable silicone composition having a viscosity of 3080 mPa·s was prepared by mixing 100 parts by mass of an organopolysiloxane that consisted of 60 parts by mass of component (a1) and 40 parts by mass of component (a2), that had a viscosity of 12500 mPa·s, and that was represented by the average composition formula:

$Vi_{0.06}Me_{1.06}Ph_{0.94}SiO_{0.97}$ 11 parts by mass of component (b2), 8 parts by mass of component (b6), 12.7 parts by mass of component (c1) (an amount that the amount of thiol groups in the present component was 1.0 mol per 1 mol of the total aliphatic carbon-carbon double bonds in the present composition), 0.27 parts by mass of component (d3), 0.01 parts by mass of component (f4), 0.7 parts by mass of component (g2), and 2.7 parts by mass of component (g4). The characteristics of the photocurable silicone composition and the cured product thereof are shown in Table 2.

TABLE 2

|  |  |  | Comparative Examples | | | | | |
|---|---|---|---|---|---|---|---|---|
|  |  |  | 1 | 2 | 3 | 4 | 5 | 6 |
| Composition of photocurable silicone composition (part by mass) | (A) | (a1) | — | 60 | 60 | 60 | 60 | 60 |
|  |  | (a2) | — | 40 | 40 | 40 | 40 | 40 |
|  |  | (a3) | 100 | — | — | — | — | — |
|  | (B) | (b1) | — | — | 1.5 | 40 | — | — |
|  |  | (b2) | 10 | — | — | — | 11 | 11 |
|  |  | (b3) | 8 | — | — | — | — | — |
|  |  | (b4) | — | — | — | — | 8 | 8 |
|  |  | (b6) | — | — | — | — | — | — |
|  | (C) | (c1) | 12.7 | 5.7 | 6.3 | 6.3 | 1.9 | 28 |
|  | (D) | (d1) | 0.4 | 0.4 | 0.4 | 0.4 | 0.4 | 0.4 |
|  |  | (d3) | — | — | — | — | — | — |
|  |  | (d4) | — | — | — | — | — | — |
|  |  | (d5) | — | — | — | — | — | — |
|  | (E) | (e1) | 0.1 | 0.2 | 0.2 | 0.2 | 0.2 | 0.2 |
|  | (F) | (f1) | 0.005 | 0.01 | 0.01 | 0.01 | 0.01 | 0.01 |
|  |  | (f4) | — | — | — | — | — | — |
|  | (G) | (g2) | 0.6 | 0.7 | 0.7 | 0.7 | 0.7 | 0.7 |
|  |  | (g4) | — | 2.7 | 2.7 | 2.7 | 2.7 | 2.7 |
| Deep curability (mm) |  |  | 1.7 | 15.3 | 34.4 | 42.2 | Not cured | 43.3 |
| Characteristics of the cured product | Initial | Appearance | Hazy | Transparent | Transparent | Transparent | — | Transparent |
|  |  | Shore 00 hardness | 22 | 25 | 27 | 18 | — | 22 |
|  |  | Transmittance (%) | 70.6 | 97.3 | 98.8 | 95.4 | — | 93.2 |
|  |  | Haze | 26.2 | <0.5 | <0.5 | <0.5 | — | <0.5 |
|  |  | Yellowness index (b*) | <1.0 | <1.0 | <1.0 | <1.0 | — | <1.0 |
|  | 105° C., after 1000 hrs. | Transmittance (%) | — | 96.8 | 98.2 | 76.6 | — | 82.2 |
|  |  | Haze | — | <0.5 | <0.5 | <0.5 | — | <0.5 |
|  |  | Yellowness index (b*) | — | — | 0.6 | 5.2 | — | 5.9 |
|  | 85° C., 85% RH, after 1000 hrs. | Transmittance (%) | — | 77.8 | 79.0 | 96.7 | — | 81.1 |
|  |  | Haze | — | 17.5 | 15.2 | 1.1 | — | <0.5 |
|  |  | Yellowness index (b*) | — | 0.4 | 0.4 | 1.3 | — | 3.6 |

|  |  |  | Comparative Examples | | | | | |
|---|---|---|---|---|---|---|---|---|
|  |  |  | 7 | 8 | 9 | 10 | 11 | 12 |
| Composition of photocurable silicone composition (part by mass) | (A) | (a1) | 60 | 60 | 60 | 60 | 60 | 60 |
|  |  | (a2) | 40 | 40 | 40 | 40 | 40 | 40 |
|  |  | (a3) | — | — | — | — | — | — |
|  | (B) | (b1) | — | — | — | — | — | — |
|  |  | (b2) | 11 | 11 | 11 | 11 | 11 | 11 |
|  |  | (b3) | — | — | — | — | — | — |
|  |  | (b4) | 8 | 8 | 8 | 8 | 8 | — |
|  |  | (b6) | — | — | — | — | — | 8 |
|  | (C) | (c1) | 12.7 | 12.7 | 12.7 | 12.7 | 12.7 | 12.7 |
|  | (D) | (d1) | 0.02 | 1.2 | — | — | — | — |
|  |  | (d3) | — | — | — | — | — | 0.27 |
|  |  | (d4) | — | — | 0.4 | 1.08 | — | — |
|  |  | (d5) | — | — | — | — | 1.08 | — |
|  | (E) | (e1) | 0.2 | 0.2 | 0.1 | 0.1 | 0.1 | — |
|  | (F) | (f1) | 0.01 | 0.01 | 0.01 | 0.01 | 0.01 | — |
|  |  | (f4) | — | — | — | — | — | 0.01 |

TABLE 2-continued

| | | | | | | | | |
|---|---|---|---|---|---|---|---|---|
| | (G) | (g2) | 0.7 | 0.7 | 0.7 | 0.7 | 0.7 | 0.7 |
| | | (g4) | 2.7 | 2.7 | 2.7 | 2.7 | 2.7 | 2.7 |
| Deep curability (mm) | | | Not cured | 42.2 | 1.3 | 1.6 | 1.5 | 6.3 |
| Characteristics of the cured product | Initial | Appearance | — | Transparent | Transparent | Transparent | Transparent | Transparent |
| | | Shore 00 hardness | — | 32 | 32 | 32 | 32 | 32 |
| | | Transmittance (%) | — | 97.6 | 98.4 | 98.4 | 98.7 | 97.6 |
| | | Haze | — | <0.5 | <0.5 | <0.5 | <0.5 | <0.5 |
| | | Yellowness index (b*) | — | <1.0 | <1.0 | <1.0 | <1.0 | <1.0 |
| | 105° C., after 1000 hrs. | Transmittance (%) | — | 76.4 | 97.9 | 97.9 | 97.9 | 97.9 |
| | | Haze | — | <0.5 | <0.5 | <0.5 | <0.5 | <0.5 |
| | | Yellowness index (b*) | — | 5.5 | 1.1 | 2.2 | 1.9 | 8.9 |
| | 85° C., 85% RH, after 1000 hrs. | Transmittance (%) | — | 78.2 | 96.3 | 95.1 | 96.0 | 96.3 |
| | | Haze | — | 1.3 | 1.2 | 1.3 | 1.4 | 1.3 |
| | | Yellowness index (b*) | — | 4.4 | 1.3 | 2.1 | 1.3 | 1.3 |

INDUSTRIAL APPLICABILITY

The present composition is cured easily by irradiation with a high energy ray, such as ultraviolet light and visible light, provides transparent cured products, and has excellent deep curability. Therefore, the present composition is useful as various potting agents, sealing agents, and adhesive agents.

The invention claimed is:

1. A photocurable silicone composition comprising:
   (A) 100 parts by mass of an organopolysiloxane represented by the average composition formula:

$R^1_a R^2_b SiO_{(4-a-b)/2}$ where $R^1$ is an alkenyl group having from 2 to 12 carbons, $R^2$ is an alkyl group having from 1 to 12 carbons, an aryl group having from 6 to 12 carbons, or an aralkyl group having from 7 to 12 carbons; provided that, at least 30 mol % of $R^2$ are the aryl groups or the aralkyl groups; and "a" and "b" are positive numbers satisfying: $1 \leq (a+b) \leq 2.5$ and $0.001 \leq a/(a+b) \leq 0.2$;
   (B) from 3 to 30 parts by mass of an organic compound having at least two ether bonds and at least one aliphatic carbon-carbon double bond in a molecule;
   (C) a compound having at least two thiol groups in a molecule, in an amount that the amount of the thiol groups in component (C) is from 0.2 to 2.0 mol per 1 mol of the total aliphatic carbon-carbon double bonds in the photocurable silicone composition;
   (D) from 0.05 to 1.0 part by mass of a photoradical initiator having a phosphorus atom;
   (E) from 0.001 to 1.0 part by mass of a hindered phenol compound; and
   (F) from 0.0001 to 1 part by mass of a radical scavenger selected from the group consisting of N,N',N'',N'''-tetrakis(4,6-bis(butyl-(N-methyl-2,2,6,6-tetramethylpiperidin-4-yl)amino)-triazin-2-yl)-4,7-diazadecane-1,10-diamine, bis(1,2,2,6,6-pentamethyl-4-piperidyl)[[3,5-bis(1,1-dimethylethyl)-4-hydroxyphenyl]methyl]butylmalonate, methyl-1,2,2,6,6-pentamethyl-4-piperidyl)sebacate, bis(2,2,6,6-tetramethyl-4-piperidyl)sebacate, bis(1,2,2,6,6-pentamethyl-4-piperidyl)sebacate, 8-acetyl-3-dodecyl-7,7,9,9-tetramethyl-1,3,8-triazaspiro[4.5]decane-2,4-dione, methylhydroquinone, 1,4-naphthoquinone, 4-methoxynaphthol, tert-butylhydroquinone, aluminum-N-nitroso-N-phenylhydroxylamine, and pyrogallol.

2. The photocurable silicone composition according to claim 1, wherein component (B) is an organic compound having at least two ether bonds and at least one acryloyl group or methacryloyl group in a molecule.

3. The photocurable silicone composition according to claim 2, further comprising (G) an organic compound having an aliphatic carbon-carbon double bond other than components (A) and (B), in an amount of 10 parts by mass or less per 100 parts by mass of component (A).

4. The photocurable silicone composition according to claim 1, further comprising (G) an organic compound having an aliphatic carbon-carbon double bond other than components (A) and (B), in an amount of 10 parts by mass or less per 100 parts by mass of component (A).

5. A cured product obtained by irradiating the photocurable silicone composition according to claim 1 with light.

* * * * *